United States Patent [19]

Zilliacus

[11] Patent Number: 5,325,701
[45] Date of Patent: Jul. 5, 1994

[54] IMPACT DYNAMOMETER

[75] Inventor: Stephen Zilliacus, Silver Spring, Md.

[73] Assignee: The United States of America as represented by the Secretary of the Navy, Washington, D.C.

[21] Appl. No.: 927,992

[22] Filed: Aug. 11, 1992

[51] Int. Cl.$^5$ .............................................. G01M 7/00
[52] U.S. Cl. ................................. 73/12.04; 73/12.06
[58] Field of Search ................. 73/12.04, 12.05, 12.09, 73/12.11, 12.01, 12.02, 12.03, 12.06–12.08, 12.10, 12.12, 12.13, 579, 580, 11.04

[56] References Cited

U.S. PATENT DOCUMENTS

| | | | |
|---|---|---|---|
| 3,456,226 | 7/1969 | Vick | 73/862.632 |
| 3,597,960 | 8/1971 | Otera et al. | 73/12.04 |
| 3,775,019 | 11/1973 | Konig et al. | 404/133 |
| 3,960,013 | 6/1976 | Ormond | 73/862.632 |
| 4,359,890 | 11/1982 | Coelus | 73/12.04 |
| 4,379,401 | 4/1983 | San Miguel | 73/12.08 |
| 4,691,556 | 9/1987 | Mellander et al. | 73/12.01 |
| 4,956,999 | 9/1990 | Bohannan et al. | 73/587 |

FOREIGN PATENT DOCUMENTS

| | | | |
|---|---|---|---|
| 57-76427 | 5/1982 | Japan | 73/12.04 |
| 0605143 | 4/1978 | U.S.S.R. | 73/12.04 |
| 0688845 | 9/1979 | U.S.S.R. | 73/12.09 |
| 945708A | 7/1982 | U.S.S.R. | 73/12.04 |

OTHER PUBLICATIONS

R. S. Schechter "A Method to Compute the Contact Force of a Body Impacting a Ring–Stiffened Cylindrical Shell Using a Lumped Parameter Finite Difference Model" NRL Memorandum Report 5286 Mar. 12, 1984.

Primary Examiner—Richard E. Chilcot, Jr.
Assistant Examiner—Elizabeth L. Dogherty
Attorney, Agent, or Firm—Charles D. Miller

[57] ABSTRACT

An impact dynamometer is provided to determine a force history that has high and low frequency components. An impact plate receives an impact force at a zone of impact and an accelerometer measures the acceleration of the impact plate at the zone of impact. A plurality of posts, located distally from the zone of impact, support the impact plate and transmit the impact force from the impact plate. One or more accelerometers measure acceleration of the impact plate at the posts. The acceleration measured at the zone of impact and at the posts is indicative of the high frequency components of the impact force. Strain gauges measure the impact force at the posts which is indicative of the low frequency components of the impact force. A spring cushion supports the posts and elastically absorbs the impact force passed through the posts in order to maintain the structural integrity of the impact dynamometer.

11 Claims, 4 Drawing Sheets

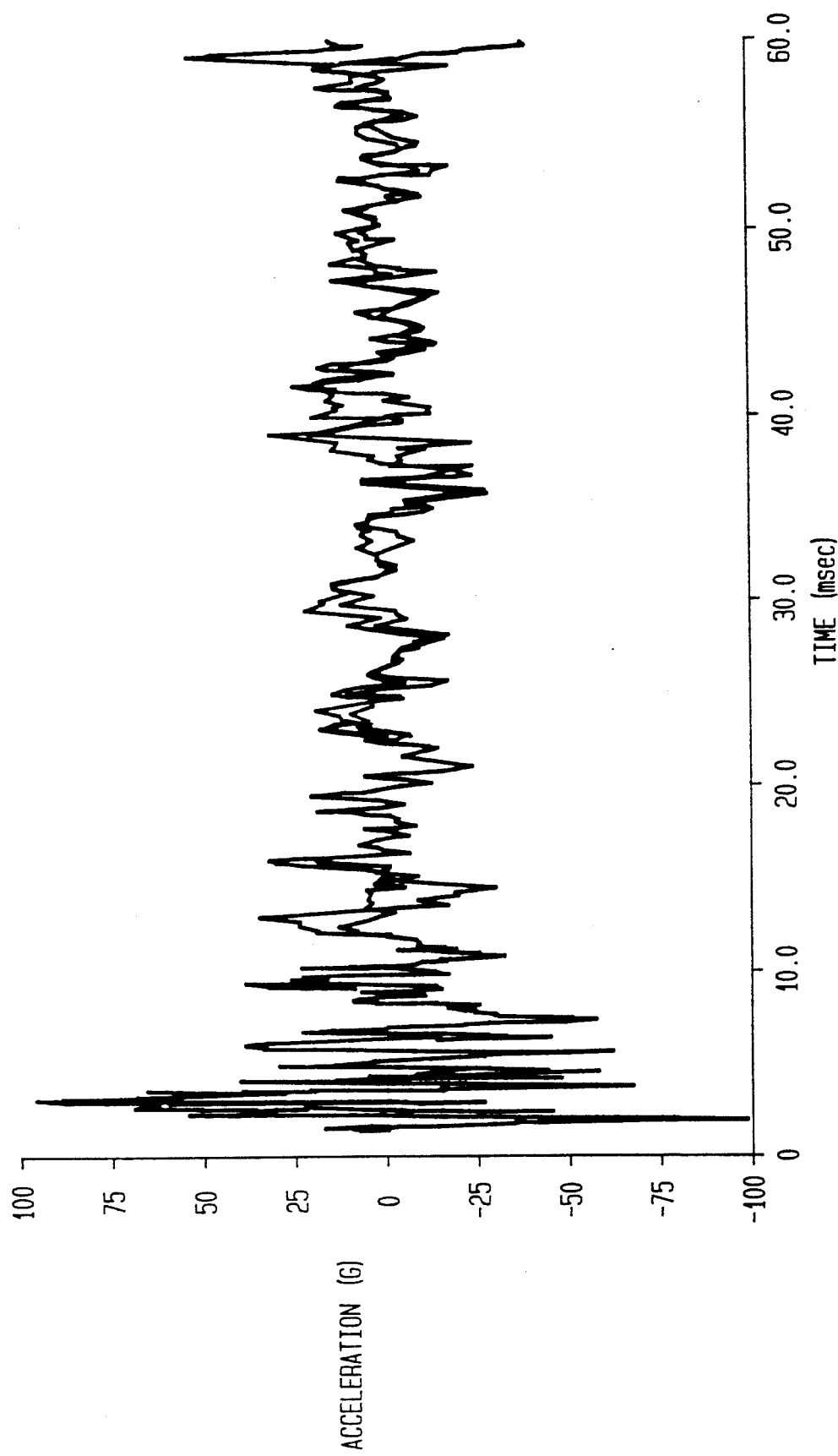

IMPACT DYNAMOMETER

The invention described herein may be manufactured and used by or for the Government of the United States of America for governmental purposes without payment of any royalties thereon or therefor.

FIELD OF THE INVENTION

The invention relates generally to dynamometers, and more particularly to an impact dynamometer that is capable of measuring a force history associated with a large (on the order of 1-2 megapounds) impact force that generates both high and low frequency components.

BACKGROUND OF THE INVENTION

During various Navy test and practice operations, practice torpedoes are routinely fired at ships, submarines or models thereof. Although these practice torpedoes are designed for last minute impact avoidance, they nevertheless occasionally strike their intended target. It is therefore of interest to know 'a priori' what kind of impact forces may result in order to predict the consequences of such an impact. Accordingly, it is desirable to develop an accurate force history spanning the time that a torpedo impacts a target.

Upon impact, torpedoes experience large inelastic deformation and often fracture. In addition, equipment internal to the torpedo may break loose and strike the forward portion of the torpedo, thereby modifying the delivered impact load. Thus, reliable impact force histories cannot in general be predicted entirely by analytical means. In the past, impact force histories were obtained from full scale tests carried out on operational boats in drydock. Alternatively, large single compartment models containing simulated equipment were impacted and various schemes were used to reconstitute the impact force histories. However, the schemes used did not provide for an accurate definition of the higher frequency impact response components (on the order of 1-10 kHz) generated by the impact. In very general terms, the higher frequency components occur during the first few milliseconds after impact while lower frequency components (less than approximately 1 kHz) are associated with the remainder of the event. An additional drawback is that the expense associated with using operational boats or large scale models greatly inhibits the amount of testing and development defining torpedo impact forces.

SUMMARY OF THE INVENTION

Accordingly, it is an object of the present invention to provide a means for accurately determining a force history associated with a torpedo's impact force on a relatively rigid target such as a submarine hull.

Another object of the present invention is to provide a means for measuring both high and low frequency components contained in a force history associated with a torpedo's impact force.

Still another object of the present invention is to provide a reusable means for deducing an impact force history associated with, for example, use of a new torpedo design.

Yet another object of the present invention is to provide a cost effective means for determining a force history associated with torpedo impact.

Other objects and advantages of the present invention will become more obvious hereinafter in the specification and drawings.

In accordance with the present invention, an impact dynamometer is provided to determine a force history associated with an impact event that contains high and low frequency components. An impact plate or anvil receives the impact force at a zone of impact and the accelerometer is measured thereat. A plurality of posts, located distally from the zone of impact, support the impact plate and transmit the impact force from the impact plate. One or more accelerometers, in cooperation with the posts, measure acceleration of the impact plate at the posts. The acceleration measured at the zone of impact and at the posts is indicative of the high frequency components of the impact force. Strain gauges measure the impact force at the posts as a measure of the low frequency components of the impact force. A spring cushion supports the posts and elastically absorbs the impact force passed through the posts in order to maintain the structural integrity of the impact dynamometer.

BRIEF DESCRIPTION OF THE DRAWINGS

FIG. 4(a) is a graph of plate acceleration at two opposing corners of the impact plate as generated by means of the present invention during receipt of an impact force.

DETAILED DESCRIPTION OF THE INVENTION

Figure 1:
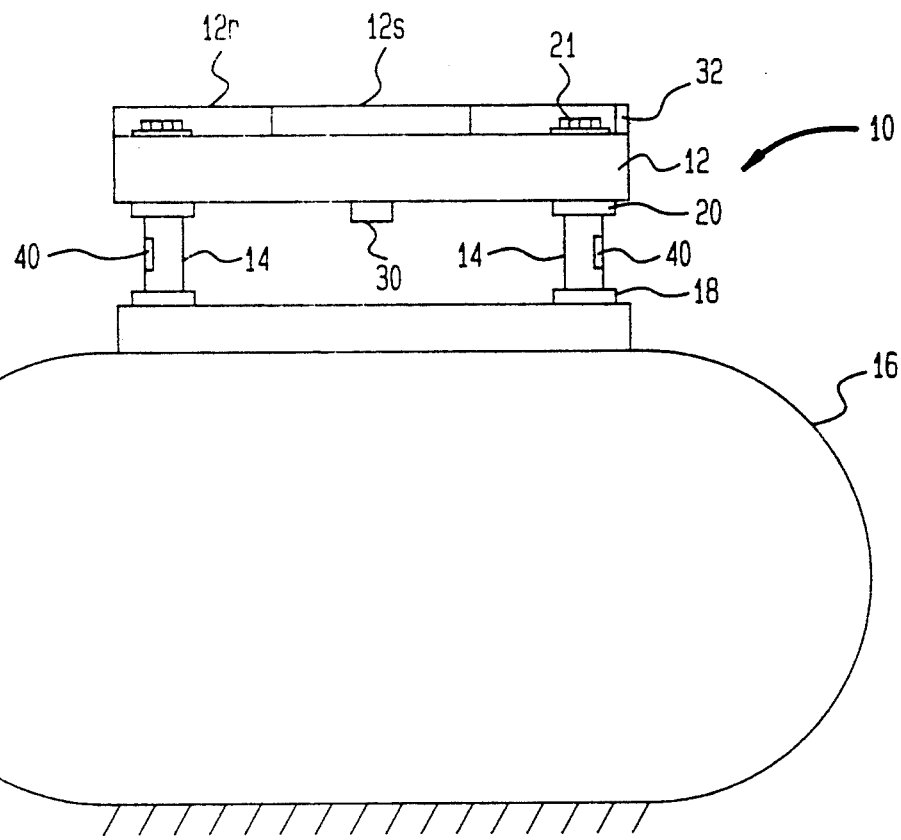
FIG. 1 is a side view of the impact dynamometer according to the present invention.
Figure 2:
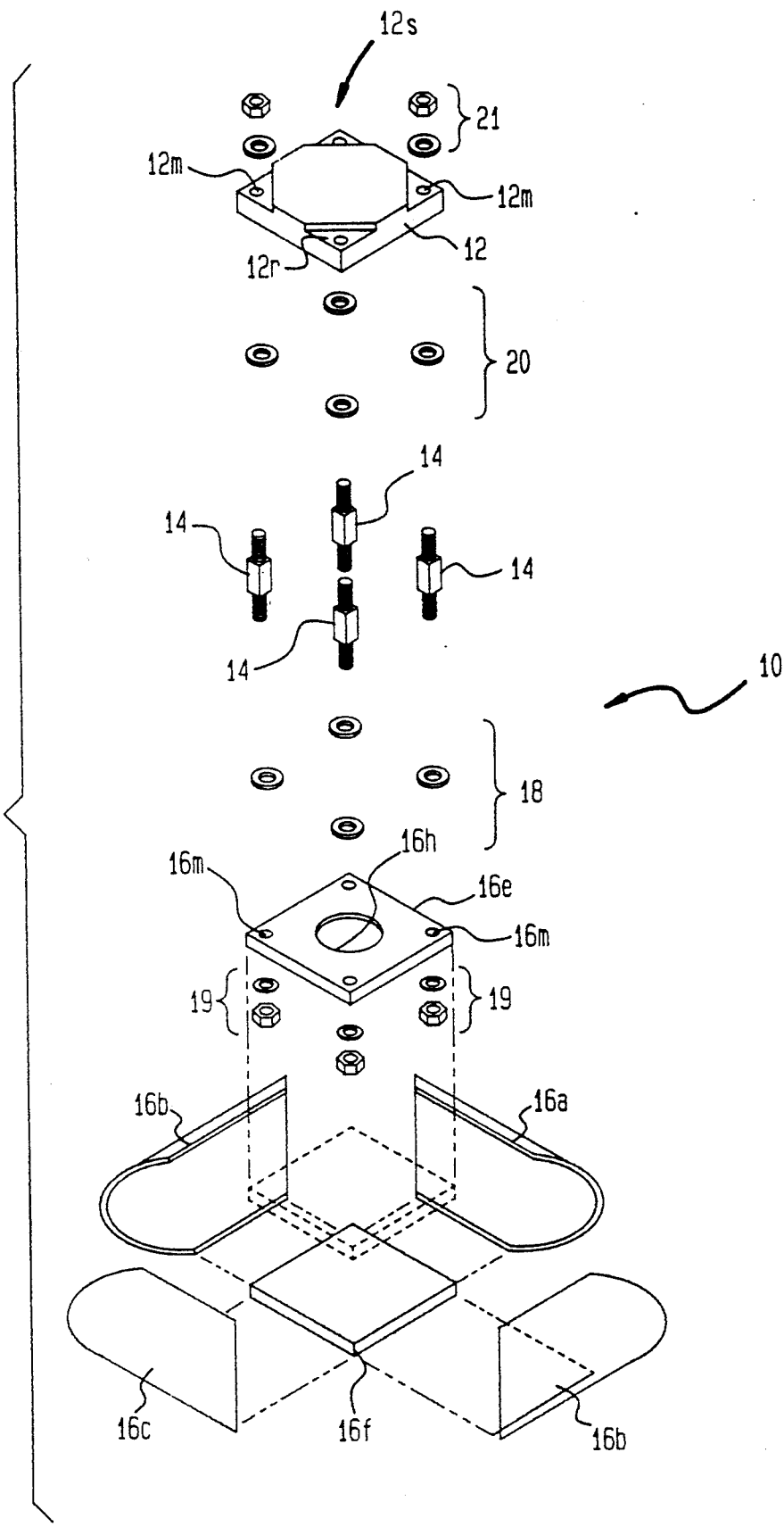
FIG. 2 is an exploded isometric view of a preferred embodiment construction of the impact dynamometer shown in FIG. 1.

Referring now to the drawings, and more particularly to FIGS. 1 and 2, FIG. 1 is a side view of an impact dynamometer 10 according to the present invention while FIG. 2 provides an exploded isometric view of a preferred embodiment construction of dynamometer 10. Accordingly, common reference numerals will be used to define like elements.

Dynamometer 10 includes an impact mass in the form of an anvil or impact plate 12 (as it will be referred to hereinafter), that is supported by four posts 14. Since posts 14 will experience axial forces and bending moments imparted by plate 12 during receipt of an impact force, posts 14 are constructed of a material that will operate in its linear range of deformation for the expected loading. In terms of large impact forces (on the order of 1-2 megapounds), titanium is one such acceptable material. The base 16 of dynamometer 10 is a spring cushion constructed from (in the preferred embodiment of FIG. 2) sections 16a, 16b, 16c and 16d of thick-walled tube sections that are joined to one another and further to a top and bottom 16e and 16f, respectively.

Each side of base 16 is one-half of a tube open to the interior of base 16. The purpose of base 16 is to reduce the rigidity of dynamometer 10 allowing elastic deformation of the dynamometer to occur upon impact. The elastic deformation provides for repeated usage of dynamometer 10. Furthermore, sizing of base 16 has been designed such that the total deflection of dynamometer 10 during impact is comparable with that of a structure being simulated. In terms of being presented with an impact force from a projectile such as a torpedo (which causes maximum damage when striking its target perpendicular to the target surface), base 16 has been designed to deflect predominantly as a single (axial) degree of freedom, i.e. in coincidence with the projectile impact direction and force. The square toroidal shape of base 16 was selected as the preferred embodiment consistent with the 2" thick steel tube sections used to construct base 16 when designing for a force that simulates a torpedo impact (i.e., 1-2 megapounds). While the design of the preferred embodiment base 16 is optimal for the impact expected and material used, it is to be understood that many other base designs are possible depending on the expected impact force and material used.

As shown, plate 12 is square and posts 14 are located at its vertices. However, as will become more apparent from the description to follow hereinafter, other plate geometries and corresponding post placements are possible. An access hole 16h is provided in top 16e to permit attachment of bottom 16f to a support ground and attachment of posts 14 to top 16e via mounting holes 16m using appropriate mounting hardware 18 and 19. Plate 12 is attached to the top of posts 14 via mounting holes 12m using appropriate hardware 20 and 21. Recesses 12r are provided in the top of plate 12 at its vertices to maintain instrumentation (to be described further hereinbelow) and hardware 21 below the impact surface 12s of plate 12.

Referring to FIG. 1, plate 12 is further outfitted with a plurality of accelerometers, the particular design of which is not a constraint on the present invention. One accelerometer 30 is placed underneath plate 12 at the center thereof as shown. An additional accelerometer 32 is placed on top of plate 12 at a corner thereof near one of the posts 14 as shown. Note that additional accelerometers may be placed at each of the other three corners of plate 12. By way of example, suitable accelerometers are model 2262A-200 and model 2262CA-200 manufactured by Endevco Corporation, 30700 Rancho Viejo Road, San Juan Capistrano, Calif. 92675. Each post 14 is outfitted with a strain gauge 40, the particular design of which is not a constraint on the present invention. By way of example, a suitable strain gauge is the model CEA-06-250UW-350 manufactured by Measurements Group, Inc., P. O. Box 27777, Raleigh, N.C. 27611.

Figure 3:
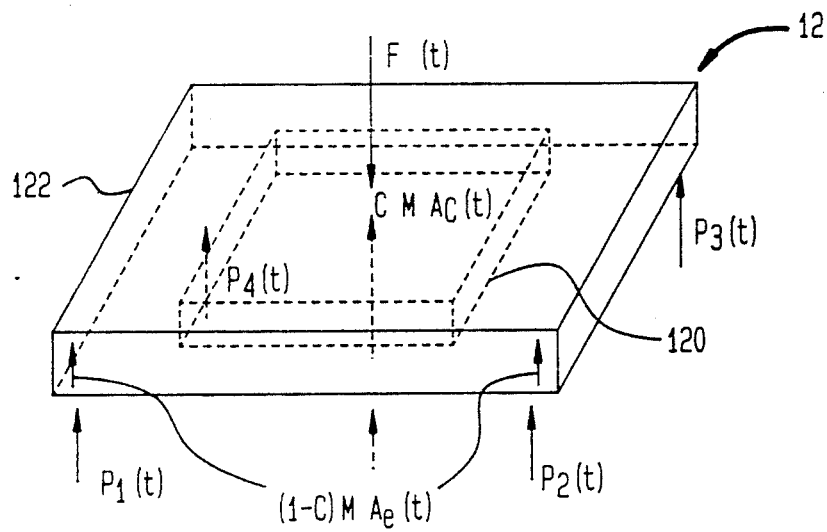
FIG. 3 is a free body force diagram used to describe the operation of the present invention.

In order to provide an understanding of the operating principles of the present invention, reference will now be made to the free body force diagram in FIG. 3 which represents the forces present during an impact on plate 12. The equilibrium condition is met by $$F(t) = P(t) + MA(t) \quad (1)$$

where
F(t) is the as yet unknown downward impact force striking plate 12 as a function of time;
P(t) is the upward reaction force as a function of time;
M is the mass of plate 12; and
A(t) is the downward acceleration of the mass M as a function of time.

Ideally, plate 12 is perfectly rigid such that the entire plate accelerates evenly. Practically, however, plate 12 is not perfectly rigid. Thus, regardless of its thickness, plate 12 does not act as a single mass. Accordingly, the mass of plate 12 may be divided into sections and the inertial resistance calculated by location. Specifically, the center portion 120 of plate 12 serves as the targeted zone of impact and the acceleration of the center portion 120 is measured by accelerometer 30. The perimeter portion 122 of plate 12 accelerates as measured by the one (or more) edge-placed accelerometer(s) 32 which are located as close to posts 14 as possible. Posts 14 are located for optimum strength and stability of the dynamometer. Further, posts 14 must be placed outside the center portion 120 so as not to interfere with the acceleration thereof when it is impacted. Conceptually, equilibrium of the two portions may be examined in accordance with D'Alembert's principle $$I_F(t) + CMA_c(t) - F(t) = 0 \quad (2)$$

and $$-I_F(t) + (1-C)MA_e(t) + P(t) = 0 \quad (3)$$

where
$I_F(t)$ is internal force experienced by plate 12 as a function of time;
$A_c(t)$ is the downward acceleration of the center of plate 12;
$A_e(t)$ is the downward acceleration of the edge of plate 12 (note that if more that one accelerometer 32 is used to measure $A_e(t)$, this quantity is an arithmetic mean of the accelerometer measurements taken at each of the edge locations; and
C is the fraction of the total plate mass which can be considered to act with the center portion of plate 12.

Since $I_F(t)$ cancels when equations (2) and (3) are combined $$F(t) = \sum_{i=1}^{N} P_i(t) + CMA_c(t) + (1-C)MA_e(t) \quad (4)$$

where
$P_i$ is the upward reaction force at each post; and
N is the number of strain gauges 40 used on posts 14. In the embodiment shown, N=4.

Calculation of C in this particular instance was based upon a finite element analysis of plate 12. A finite element code that may be used in this analysis is ADINA as disclosed by K. J. Bathe in "ADINA—A Finite Element Program for Automatic Dynamic Incremental Nonlinear Analysis", Massachusetts Institute of Technology Report No. 82448-1, 1975 and as revised in 1978. For the preferred embodiment, C was determined to be 0.55. Note that if plate 12 were perfectly rigid, C would have the value of 1.0 and only accelerometer 30 would be needed.

Upon receiving an impact at the center of plate 12 (on its surface 12s), the downward acceleration of plate 12 at both its center ($A_c(t)$) and its edges ($A_e(t)$) registers in accelerometers 30 and 32, respectively. These acceleration measurements are indicative of the earliest, highest frequency components of the impact. As time passes, the impact force is passed through plate 12 to each of the posts 14 supporting plate 12. Since posts 14 provide the only load path for the impact force, the strain gauges 40 provide an accurate measure of the more persistent, lower frequency components of the impact force. Thus, the resulting force history F(t) gives a clear indication of the force by combining both the high and low frequency components.

Figure 4B:
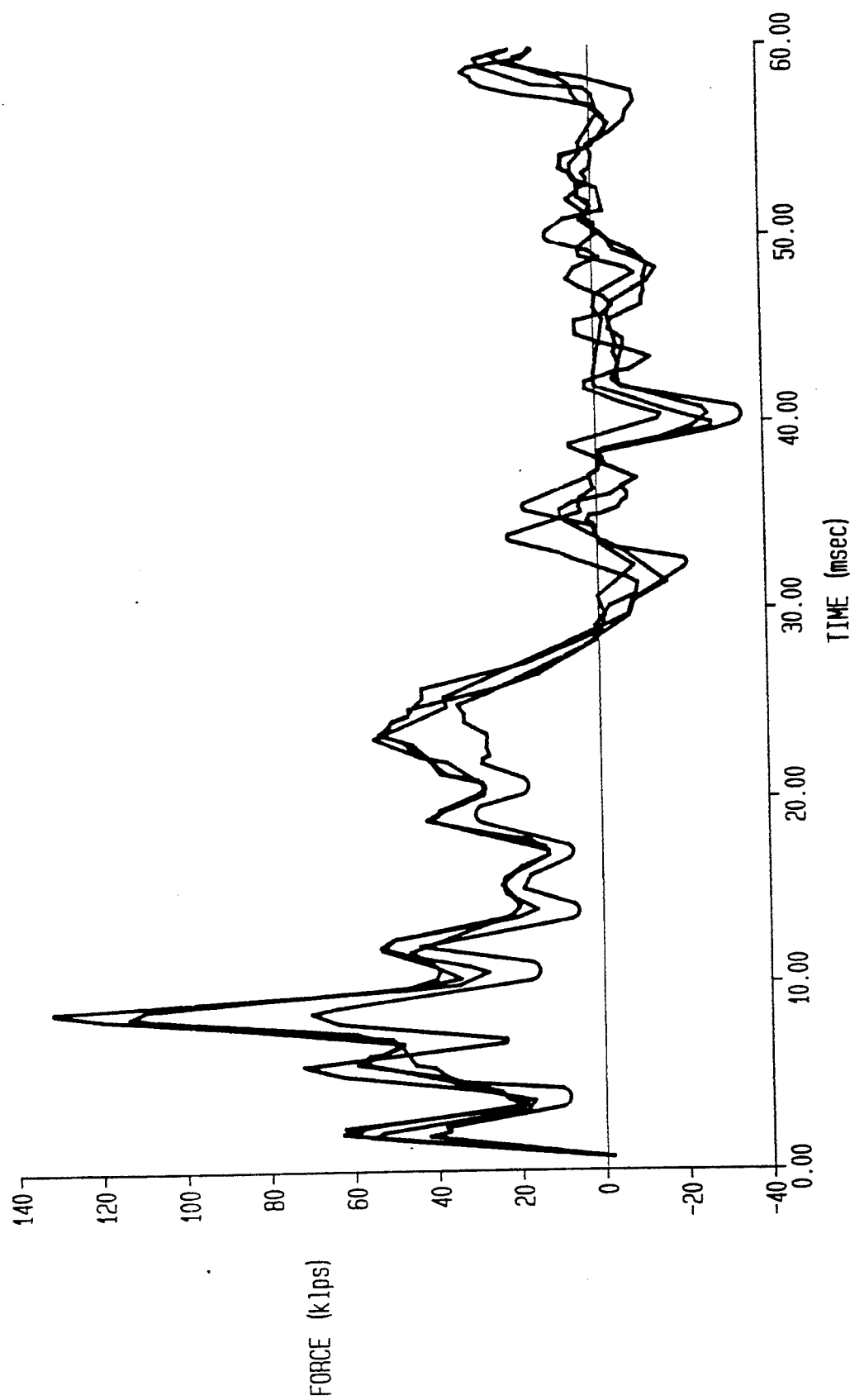
FIG. 4(b) is a graph of plate forces experienced at four support posts as generated by means of the present invention during receipt of the impact force.

By way of example, dynamometer 10 was built and tested to reconstitute a rigid target impact force history associated with a large scale force (1-2 megapounds) that would be delivered by a large (2-3 kilopounds) projectile traveling at a speed between 80-120 feet per second. Plate 12 of the tested dynamometer was a 7" thick steel plate that measured 38" on each side. The four posts 14 were made from titanium and measured 3.25" square by 6" long. Base 16 was constructed as outlined above from 2" thick steel tubing having an 18" outside radius. The dynamometer constructed in this fashion was subjected to numerous impact loadings. Representative acceleration and force measurement graphs are shown in FIGS. 4(a) and 4(b), respectively. Specifically, the acceleration $A_c(t)$ as measured at two opposing corners of plate 12 by accelerometers 32 is shown in FIG. 4(a). As is readily apparent, the amount of cyclic activity is greatest in the first 10 msec. This is indicative of the high frequency components of the force history. In contrast, the reaction forces $P_i(t)$ at the four posts, as measured by strain gauges 40, is shown in FIG. 4(b). Note that the lesser amount of cyclic activity is indicative of the low frequency components of the impact force history.

The advantages of the present invention are numerous. A reusable impact dynamometer design provides for the accurate measurement of both high and low frequency components of an impact force. Further, design specifics are disclosed for an impact dynamometer that will provide a force history that approximates that of a torpedo impacting a ship or submarine hull. Thus, the present invention will provide ship and submarine designers with information that was previously only available when an existing hull or large scale model was available. Additionally, the dynamometer of the present invention could be employed for determining road vehicle impact force histories.

Although the invention has been described relative to a specific embodiment thereof, there are numerous variations and modifications that will be readily apparent to those skilled in the art in the light of the above teachings. For example, as described above, plate 12 could be formed of a different geometry (e.g. triangle, pentagon, etc.) and the placement of posts 14 would coincide with the vertices of such a geometry. In addition, the shape and design of base 16 may be altered to suit a specific purpose. It is therefore to be understood that, within the scope of the appended claims, the invention may be practiced other than as specifically described.

What is claimed is:

1. An impact dynamometer for determining a force history associated with an impact force that contains high and low frequency components, comprising:
    means for receiving the impact force at a zone of impact;
    means for measuring acceleration of said receiving means at said zone of impact;
    means, in cooperation with said receiving means, for defining a plurality of structural load paths to transmit the impact force from said receiving means, each of said structural load paths being located distally from said zone of impact;
    means, in cooperation with said defining means, for measuring acceleration of said receiving means at said structural load paths, wherein the acceleration measured at said zone of impact and at said structural load paths is indicative of the high frequency components;
    means, in cooperation with said defining means, for measuring the impact force at said structural load paths as a measure of the low frequency components; and
    means, in cooperation with said defining means, for elastically absorbing the impact force via said structural load paths, whereby structural integrity of said impact dynamometer is maintained.

2. An impact dynamometer as in claim 1 wherein said means for measuring acceleration of said receiving means at said zone of impact and at said structural load paths comprise accelerometers.

3. An impact dynamometer as in claim 1 wherein said means for measuring the impact force at said structural load paths comprise strain gauges.

4. An impact dynamometer for determining a force history associated with an impact force that contains high and low frequency components, comprising:
    an impact plate for receiving the impact force at a zone of impact;
    means for measuring acceleration of said impact plate at said zone of impact;
    a plurality of posts, located distally from said zone of impact, for supporting said impact plate and for transmitting the impact force from said impact plate;
    means, in cooperation with at least one of said posts, for measuring acceleration of said impact plate at said at least one post, wherein the acceleration measured at said zone of impact and at said at least one post is indicative of the high frequency components;
    means for measuring the impact force at said posts as a measure of the low frequency components; and
    means including a spring for supporting said posts and for elastically absorbing the impact force passed through said posts, whereby structural integrity of said impact dynamometer is maintained.

5. An impact dynamometer as in claim 4 wherein said means for measuring acceleration of said impact plate at said zone of impact and at said at least one post comprise accelerometers.

6. An impact dynamometer as in claim 4 wherein said means for measuring the impact force at said posts comprise strain gauges.

7. An impact dynamometer as in claim 4, said impact plate having a square cross-section, wherein said zone of impact is located in the center of said impact plate and said plurality of posts comprise four posts located substantially at the vertices of said impact plate.

8. An impact dynamometer as in claim 4 wherein said impact plate is situated to receive the impact force from a direction that is substantially perpendicular to said zone of impact.

9. An impact dynamometer for determining a force history associated with an impact force of a torpedo that contains high and low frequency components, comprising:
    means for receiving the impact force at a zone of impact;
    a plurality of load paths for transmitting the impact force from said receiving means, each of said load paths being located distally from said zone of impact;

means including at least two accelerometers, in cooperation with said receiving and said load paths, for defining the high frequency components of the impact force;

means, in cooperation with said load paths, for defining the low frequency components of the impact force; and means including a metal spring, in cooperation with said load paths, for elastically absorbing the impact force, whereby structural integrity of said impact dynamometer is maintained.

10. An impact dynamometer as in claim 9 wherein said load paths comprise a plurality of posts for supporting said receiving means.

11. A reusable dynamometer for determining a force history of an impact force that contains high and low frequency components comprising:

an anvil in the form of a square plate having four corners for receiving the impact force;

a square toroidal spring;

four titanium posts connected between the said spring and the said anvil a first accelerometer mounted near the center of said anvil;

a second accelerometer mounted near one of the corners of said anvil;

a first strain gage mounted on a first one of said four posts;

a second strain gage mounted on a second one of said four poses;

whereby the first and second accelerometers provide outputs indicative of high frequency components of the impact force, the first and second strain gages provide outputs indicative of the low frequency components of the impact force and the said spring elastically absorbs a portion of said impact force to maintain structural integrity of said dynamometer, so that it can be reused.

* * * * *